United States Patent
Weissman et al.

(10) Patent No.: US 7,698,266 B1
(45) Date of Patent: Apr. 13, 2010

(54) MEANING-BASED ADVERTISING AND DOCUMENT RELEVANCE DETERMINATION

(75) Inventors: Adam J Weissman, Los Angeles, CA (US); Gilad Israel Elbaz, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 1013 days.

(21) Appl. No.: 10/807,264

(22) Filed: Mar. 24, 2004

Related U.S. Application Data

(63) Continuation of application No. 09/493,701, filed on Jan. 28, 2000, now Pat. No. 6,816,857, which is a continuation-in-part of application No. 09/431,760, filed on Nov. 1, 1999, now Pat. No. 6,453,315.

(51) Int. Cl.
*G06F 17/30* (2006.01)
*G06F 7/00* (2006.01)

(52) U.S. Cl. .......................................................... 707/5
(58) Field of Classification Search ........................ 705/5
See application file for complete search history.

(56) References Cited

U.S. PATENT DOCUMENTS

| | | | | |
|---|---|---|---|---|
| 4,839,853 A | | 6/1989 | Deerwester et al. ............ | 707/5 |
| 5,056,021 A | * | 10/1991 | Ausborn ........................ | 704/9 |
| 5,128,865 A | | 7/1992 | Sadler | |
| 5,325,298 A | | 6/1994 | Gallant ........................... | 704/9 |
| 5,418,948 A | * | 5/1995 | Turtle ............................ | 707/4 |
| 5,488,725 A | * | 1/1996 | Turtle et al. .................... | 707/5 |
| 5,493,677 A | * | 2/1996 | Balogh et al. ............. | 707/104.1 |
| 5,499,360 A | | 3/1996 | Barbara et al. ................. | 707/5 |
| 5,619,709 A | * | 4/1997 | Caid et al. ................... | 715/532 |
| 5,680,511 A | | 10/1997 | Baker et al. | |
| 5,694,523 A | | 12/1997 | Wical | |
| 5,724,521 A | * | 3/1998 | Dedrick ........................ | 705/26 |
| 5,740,549 A | | 4/1998 | Reilly et al. | |
| 5,778,362 A | | 7/1998 | Deerwester | |
| 5,778,363 A | | 7/1998 | Light ............................. | 707/5 |
| 5,794,050 A | * | 8/1998 | Dahlgren et al. ............ | 717/144 |
| 5,842,206 A | * | 11/1998 | Sotomayor ..................... | 707/5 |
| 5,845,278 A | | 12/1998 | Kirsch et al. ................... | 707/3 |
| 5,848,397 A | | 12/1998 | Marsh et al. | |
| 5,873,056 A | | 2/1999 | Liddy et al. | |
| 5,933,822 A | | 8/1999 | Braden-Harder et al. ....... | 707/5 |
| 5,940,821 A | * | 8/1999 | Wical ............................ | 707/3 |
| 5,948,061 A | | 9/1999 | Merriman | |

(Continued)

FOREIGN PATENT DOCUMENTS

EP 000597630 A1 * 5/1994

(Continued)

OTHER PUBLICATIONS

Voorhees, E.M. "Query Expansion Using Lexical-Semantic Relations", Proceedings of the 17th Annual International ACM SIGIR Confrernce on Research and Development in Information Retrieval, 1994, pp. 61-69.*

(Continued)

*Primary Examiner*—Luke S Wassum
(74) *Attorney, Agent, or Firm*—Fish & Richardson P.C.

(57) ABSTRACT

A method for advertising on electronic data networks based upon semantic differentiation.

19 Claims, 9 Drawing Sheets

U.S. PATENT DOCUMENTS

| | | | |
|---|---|---|---|
| 5,974,398 A * | 10/1999 | Hanson et al. | 705/14 |
| 5,974,412 A * | 10/1999 | Hazlehurst et al. | 707/3 |
| 5,987,404 A | 11/1999 | Della Pietra et al. | |
| 6,026,368 A | 2/2000 | Brown et al. | |
| 6,026,374 A * | 2/2000 | Chess | 705/26 |
| 6,038,560 A * | 3/2000 | Wical | 707/5 |
| 6,044,375 A | 3/2000 | Shmueli et al. | 707/101 |
| 6,044,376 A | 3/2000 | Kurtzman, II | |
| 6,067,552 A | 5/2000 | Yu | 715/501.1 |
| 6,078,866 A * | 6/2000 | Buck et al. | 702/2 |
| 6,078,914 A | 6/2000 | Redfern | |
| 6,101,515 A | 8/2000 | Wical | |
| 6,119,164 A | 9/2000 | Basche | 709/229 |
| 6,134,532 A * | 10/2000 | Lazarus et al. | 705/14 |
| 6,141,010 A * | 10/2000 | Hoyle | 715/854 |
| 6,144,944 A | 11/2000 | Kurtzman, II et al. | |
| 6,167,382 A | 12/2000 | Sparks et al. | |
| 6,216,129 B1 * | 4/2001 | Eldering | 705/36 R |
| 6,216,134 B1 * | 4/2001 | Heckerman et al. | 707/104.1 |
| 6,247,009 B1 | 6/2001 | Shiiyama et al. | |
| 6,269,361 B1 * | 7/2001 | Davis et al. | 707/3 |
| 6,285,987 B1 * | 9/2001 | Roth et al. | 705/27 |
| 6,289,342 B1 | 9/2001 | Lawrence et al. | 707/7 |
| 6,289,353 B1 * | 9/2001 | Hazlehurst et al. | 707/102 |
| 6,298,348 B1 * | 10/2001 | Eldering | 705/36 R |
| 6,314,419 B1 | 11/2001 | Faisal | 707/2 |
| 6,324,519 B1 * | 11/2001 | Eldering | 705/14 |
| 6,401,075 B1 | 6/2002 | Mason et al. | |
| 6,421,675 B1 * | 7/2002 | Ryan et al. | 707/100 |
| 6,453,315 B1 * | 9/2002 | Weissman et al. | 707/5 |
| 6,457,010 B1 * | 9/2002 | Eldering et al. | 707/10 |
| 6,460,034 B1 * | 10/2002 | Wical | 707/5 |
| 6,513,027 B1 * | 1/2003 | Powers et al. | 706/47 |
| 6,560,578 B2 * | 5/2003 | Eldering | 705/14 |
| 6,675,159 B1 * | 1/2004 | Lin et al. | 707/3 |
| 6,816,857 B1 * | 11/2004 | Weissman et al. | 707/5 |
| 6,907,566 B1 * | 6/2005 | McElfresh et al. | 715/517 |
| 6,978,263 B2 * | 12/2005 | Soulanille | 707/3 |
| 6,985,882 B1 | 1/2006 | Del Sesto | |
| 7,039,599 B2 | 5/2006 | Merriman | |
| 7,062,510 B1 * | 6/2006 | Eldering | 707/104.1 |
| 7,136,875 B2 | 11/2006 | Anderson et al. | |
| 2005/0144069 A1 * | 6/2005 | Wiseman et al. | 705/14 |
| 2005/0222900 A1 * | 10/2005 | Fuloria et al. | 705/14 |
| 2006/0122884 A1 * | 6/2006 | Graham et al. | 705/14 |
| 2007/0094221 A1 * | 4/2007 | Au | 706/55 |
| 2007/0094222 A1 * | 4/2007 | Au | 706/55 |
| 2007/0094223 A1 * | 4/2007 | Au | 706/55 |
| 2007/0094224 A1 * | 4/2007 | Au | 706/55 |
| 2007/0094225 A1 * | 4/2007 | Au | 706/55 |

FOREIGN PATENT DOCUMENTS

| | | |
|---|---|---|
| WO | WO 97/21183 | 6/1997 |

OTHER PUBLICATIONS

Braun, S. and C. Schwind "Automatic, Semantics-Based Indexing of Natural Language Textx for Information Retrieval Systems", Information Processing & Management, vol. 12, No. 2, 1976, pp. 147-153.*

Schutze, H. "Automatic Word Sense Discrimination", Computational Linguistics, vol. 24, No. 1, Mar. 1998, pp. 97-123.*

Pado, S. and M. Lapata "Dependency-Based Construction of Semantic Space Models", Computational Linguistics, vol. 33, No. 2, Jun. 2007, pp. 161-199.*

Koll, M.B. "Information Retrieval Theory and Design Based on a Model of the User's Concept Relations," Proceedings of the 3$^{rd}$ Annual ACM Conference on Research and Development in Information Retrieval, pp. 77-93, 1980.

Voorhees, E.M. "Query Expansion using Lexical-Semantic Relations," Proceedings of the 17$^{th}$ Annual ACM Conference on Research and Development in Information Retrieval, Aug. 1994, pp. 61-69.

Tengi, R.I., "Design and Implementation of the WorldNet Lexical Database and Searching Software," in "WordNet: An Electronic Lexical Database," Fellbaum, C. ed., Cambridge: The MIT Press, Mar. 1998, pp. 105-127.

Fellbaum, C., ed. "WordNet: An Electronic Lexical Database," Caimbridge: The MIT Press, Mar. 1998, pp. 117-127, 285-303. P325.5 D38W67 1998.

U.S Appl. No. 95/001,073, filed Sep. 30, 2004, Reexamination of Stone et al.

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way To Buy And Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

Sutcliffe, R.F.E. et al. "The Automatic Acquisition of a Broad-Coverage Semantic Lexicon for use in Information Retrieval", Proc of the AAI Symp Representation and Acquisition of Lexical Knowledge: Polysemy, Ambiguity and Generativity, Mar. 27-29, 1995, Technical Report SS-95-01, pp. 163-167.

Brachman, R.J. and Schmolze, J.G. "An Overview of the KL-ONE Knowledge Representation System", Cognitive Science vol. 9, 1985, pp. 171-216.

Budanitslcy, A "Lexical Semantic Relatedness and its Application in Natural Language Processing", Technical Report CSRG-390, Computer Systems Research Group, University of Toronto, pp. 1-146, Aug. 1999.

Caudal, P. "Using Complex Lexical Types to Model the Polysemy of Collective Nouns within the *Generative Lexicon*", Proceedings of the Ninth International Workshop on Database and Expert Systems Applications, 1998, pp. 154-159.

Chakravarthy, A.S. And Haase, K.B. "NetSerf Using Semantic Knowledge to Find Internet Information Archives", Proc of the 18$^{th}$ Annual International ACM SIGIR Conference on Research and Development in Information Retrieval, Jul. 1995, pp. 4-11.

Collins, A.M. and Loftus, E.F. "A Spreading-Activation Theory of Semantic Processing", Psychological Review, vol. 82, No. 6, 1975, pp. 407-428.

Ferri et al. "Toward a Retrieval of HTML Documents Using a Semantic Approach", IEEE International Conference on Multimedia and Expo. vol. 3, 2000, pp. 1571-1574.

Meijs, W. "Inferring Grammar from Lexis: Machine-Readable Dictionaries as Sources of Wholesale Syntactic and Semantic Information", IEEE Colloquium on Grammatical Inference: Theory, Applications and Alternatives, 1993, pp. P3/1-P3/5.

Mihalcea, R. and Moldovan, D. "Semantic Indexing using WordNet Senses", Proc of the ACL Workshop on IR and NLP Oct. 2000, pp. 35-45.

Rada, R. et al. "Development and Application of a Metric on Semantic Nets", IEEE Transactions of Systems, Man and Cybernetics, vol. 19, No. 1, Jan./Feb./1989, pp. 17-30.

Resnik, P. "Semantic Similarity in a Taxonomy: An Information-Based Measure and its Application to Problems of Ambiguity in Natural Language", Journal of Artificial Intelligence Research, vol. 11, Jul. 1999, pp. 95-130.

Smeaton, A.F. and Quigley, in. "Experiments on Using Semantic Distances Between Words in Image Caption Retrieval", Proc of the 19$^{th}$ International Conference on Research and Development in Information Retrieval, Aug. 1996, pp. 174-180.

St-Onge, D. "Detecting and Correcting Malapropisms with Lexical Chains", M.S. Thesis, University of Toronto, Mar. 1995.

Richardson, R., Smeaton, A.F. and Murphy, J. "Using Wordnet for Conceptual Distance measurement", roc. Of the 16$^{th}$ Research Colloquium of the BCS-IRSG, 1994, pp. 100-123.

Buckley, C. et al. "Automatic Query Expansion Using SMART: TREC-3", Proceedings of the Text Retrieval Conference (TREC3), Nov. 1994, pp. 69-81.

Budanitsky, A. and Hirst, G. "Semantic Distance in WordNet: An Experimental, Application-Oriented Evaluation of Five Measures", Proc of the North Amer. Association for Computational Linguistics, WordNet and Other Lexical Resources Workshop, Jun. 2-7, 2001.

Sutcliffe, R.F.E. et al. "Beyond Keywords: Accurate Retrieval from Full Text Documents", Proceedings of the 2$^{nd}$ Language Engineering Convention, Oct. 16-18, 1995.

* cited by examiner

MEANING-BASED ADVERTISING AND DOCUMENT RELEVANCE DETERMINATION

This application is a continuation of U.S. patent application Ser. No. 09/493,701, filed on Jan. 28, 2000, which is a continuation-in-part of U.S. patent application Ser. No. 09/431,760 filed on Nov. 1, 1999 entitled "Meaning-Based Information Organization and Retrieval," now U.S. Pat. No. 6,453,315.

FIELD OF THE INVENTION

The invention relates generally information organization and retrieval. More specifically, the invention relates to advertising and document relevance determination.

BACKGROUND

The Internet, which is a global network of interconnected networks and computers, commonly makes available a wide variety of information through a vehicle known as the World Wide Web (WWW). Currently, hundreds of millions of "web sites," that house and format such information in documents called web pages are available to users of the Internet. Since the content of such pages is ungoverned, unregulated and largely unorganized between one site and the next, finding certain desired information is made difficult.

To aid users in finding sites or pages having information they desire, search engines were developed. Search engines and directories attempt to index pages and/or sites so that users can find particular information. Typically, search engines are initiated by prompting a user to type in one or more keywords of their choosing along with connectors (such as "and") and delimiters. The search engine matches the keywords with documents or categories in an index that contain those keywords or are indexed by those keywords and returns results (either categories or documents or both) to the user in the form of URLs (Uniform Resource Locators). One predominant web search engine receives submissions of sites and manually assigns them to categories within their directory. When the user types in a keyword, a literal sub-string match of that keyword with either the description of the site in their index or the name of the category occurs. The results of this sub-string search will contain some sites of interest, but in addition, may contain many sites that are not relevant or on point. Though one may refine the search with yet more keywords, the same sub-string match will be employed, but to the result set just obtained. Almost all search engines attempt to index sites and documents and leave it to the user to formulate an appropriate query, and then to eliminate undesired search results themselves. Recently other search engines using natural language queries have been developed but these also often result in many undesired responses.

The quality of the results obtained varies, but by doing essentially sub-string matches or category browsing, the engines are unable to properly discern what the user actually intends or means when a particular keyword is entered. Thus, the response to search terms entered is a list of documents/sites that may bear little relation to the intended meaning/usage of the term(s) entered.

One corollary response to search terms input into search engine is the retrieval and display of advertising icons often referred to as "banner ads." One ad-buying model for companies and web sites desiring to advertise on a search engine is to purchase one or more search terms. When the search term(s) are input by a user of the search engine, the corresponding banner ad is displayed. Again, because of the limitation of most search engines, the advertiser must purchase several search terms to cover a given concept or meaning that may have multiple equivalent terms associated with them. For instance, a computer manufacturer may have to buy "computer," "PC," and "desktop" if they desire to have an ad for computers appear. If the advertiser cannot afford the increase in cost certain equivalent expressions may be entirely missed by the ad campaign. One other factor with banner ads is that related terms or expressions may be completely ignored. For instance, the term "hardware" is not equivalent but related to "computer" and may be a related concept the advertiser desires to capture but cannot unless explicitly purchased.

The responses to a given search term are often based upon the manner in which documents or pointers to documents are indexed in a directory. Internet search engines often index documents and pointers to those documents based upon one or more keywords, which may be embedded within the document, and/or automatically determined by analyzing the document or input manually by a user or reviewer desiring to have the document indexed. Some of these methods of indexing rely on the precision of the terms used and not concepts or meanings.

BRIEF DESCRIPTION OF THE DRAWINGS

The objects, features and advantages of the method and apparatus for the present invention will be apparent from the following description in which.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The searching paradigm presented herein relies on an unconventional approach to information retrieval; namely, the idea of a "meaning-based" search. Instead of simply indexing words that appear in target documents, and allowing users to find desired word instances within documents or an index, searches are instead conducted within the realm of "semantic space", allowing users to locate information that is "close in meaning" to the concepts they are interested in.

A search engine and searching paradigm so implemented enables Web users to easily locate subject categories within a large subject directory, such as Netscape's Open Directory (a product of Netscape Communications Corporation) by a convenient and meaningful manner. A "target document" refers to a single subject page within such a directory. Such a subject directory is arranged in a roughly hierarchical fashion and consists of many unique topics. By allowing users to refine their searches to specific meanings of words, the invention in its various embodiments enables users to quickly filter out undesired responses, and therefore achieve more precise and more relevant search results. For example, the user would be able to filter out results relating to the concept of "Bulls" as a basketball team, because they are only interested in the concept of "Bulls" as a kind of cattle. Because searches conducted using search engines implemented according to the invention result in presenting conceptual areas "near" to a particular meaning, the user is also presented with categories that are likely to be of interest, yet might have been missed by a traditional search approach. An example would be a result of "Cows" to a search on "Bulls", which would come up as a result because the concepts are deemed "near" to each other in semantic space.

Figure 1:
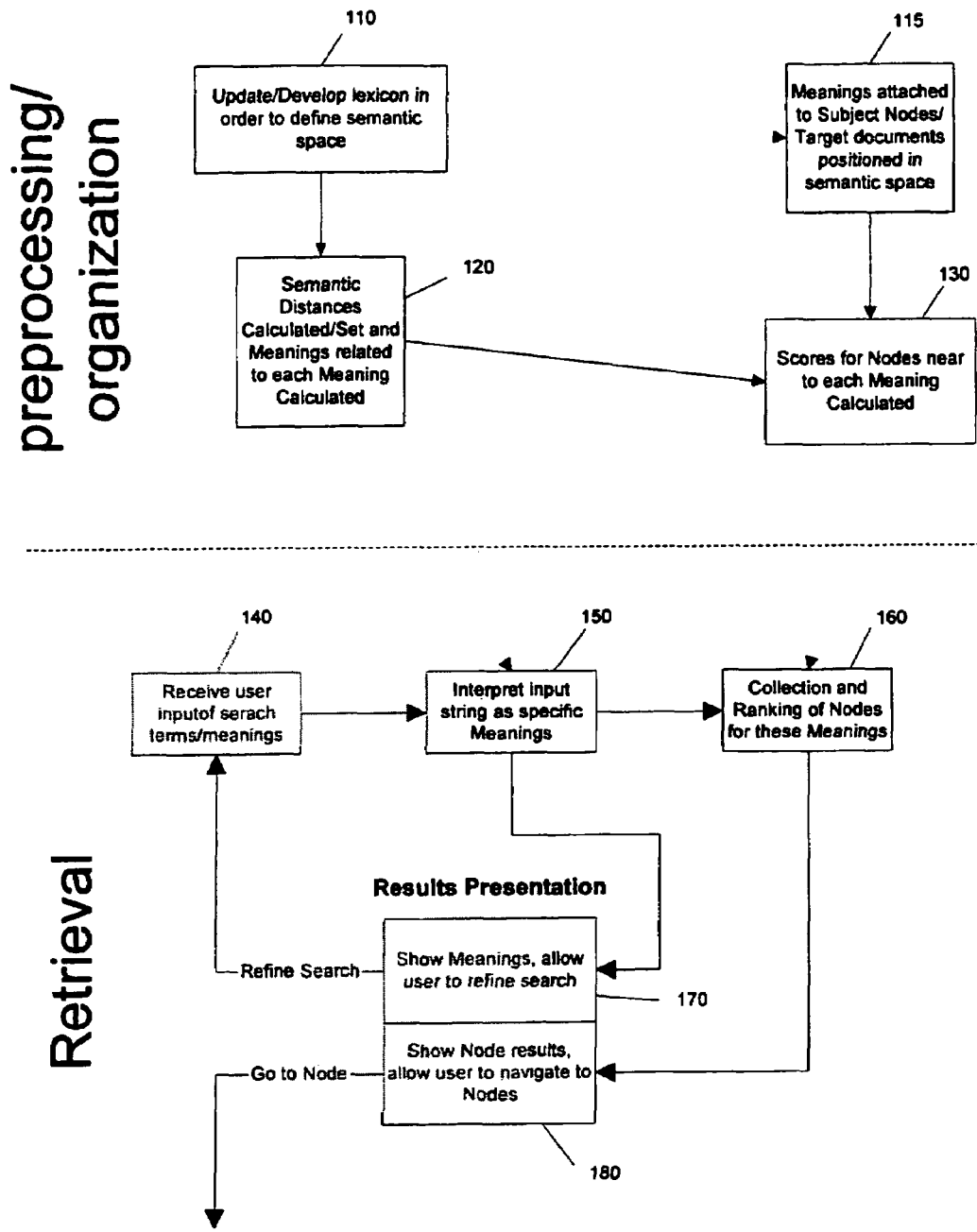
FIG. 1 is a flow diagram of the operation of a meaning-based search engine.

FIG. 1 is a flow diagram of one or more embodiments of the invention.

The flow diagram in FIG. 1 for implementing meaning-based information organization and retrieval system may be summarized as follows:

Pre-Processing/Organization

1. Define a "semantic space" by creating an interconnected lexicon of meanings.

2. Determine the "semantic distance" between meanings in semantic space that describes how close, conceptually, one meaning is to another.

3. Designate a "location" in semantic space for each target document.

4. Pre-calculate "scores" for each "target document" for each relevant input meaning, based on nearness in semantic space obtained by measuring semantic distance.

Retrieval

1. Implement a search engine that converts an input string into a set of probable desired meanings, then locates targets based mainly on pre-calculated scores.

2. Create a user-interface to the engine that allows users to easily make "initial" and "refined" searches, and that presents results to users in a logical and orderly fashion.

Referring to FIG. 1:

Block 110

In the pre-processing or organization stage, the first step is develop/update a useful meaning-based lexicon (block 110). A "lexicon" is a network of interconnected meanings; it describes the "semantic space" that is employed by the search engine. One such lexicon already in existence consists of thousands of meanings, or "synsets", which are connected to one another through two key relationships: "kind of" and "part of". For example, the concept of "table" is connected to the concept of "furniture" through a "kind of" connection. Thus, "table" is a kind of "furniture". Similarly, "California" is a part of "United States".

From this basis, the lexicon can be updated and expanded to include new meanings or update connections for meanings already present. New meanings can be updated mainly to reflect the importance in everyday culture of a large number of proper nouns, which are not available in many lexicons such as the names of companies, people, towns, etc. In addition, new meanings may have to be developed within the lexicon in order to cover subject areas of common interest with greater specificity. For example, whereas an existing lexicon might define the idea of a "programming language", it may be useful to expand this concept within the lexicon to designate the many hundreds of specific programming languages that may exist as "kind of" children to this meaning.

Additionally, an innovative type of relationship between meanings has been developed as a corollary to the invention, in order to convey information that is not treated in lexicons. This relationship, called a "bind", describes one meaning's closeness to another meaning in people's common understanding. For example, "skier" and "skiing" are not closely related concepts in existing lexicons. The former is a kind of "athlete", ultimately a kind of "human being"; and thus would reside within the "entity" or "living thing" tree. The latter is a kind of "sport", ultimately a kind of "activity"; it is in the "actions" tree. Though the subjects are closely related in everyday usage, they may be in widely separated locations within the lexicon's network of meanings. To remedy this, a "bind" has been made between the two meanings, to reflect their close proximity in semantic space (when you think of one concept, you tend to think of the other). This new type of bonding between meanings is essential for creating a "semantic space" that will yield useful search results.

An extension to this "bind" connection is the concept of varying "bond strengths" between meanings. A value can be assigned to a connection from one meaning to another that signifies how strongly the second meaning relates to the first. These connection strengths are dependent on the direction of the bond, so that, for example, "skier" might imply a strong connection to "skiing", whereas "skiing" need not imply "skier" to the same degree.

One other enhancement is the addition of a "commonness" value to each meaning, which reflects a combination of "how often does this concept arise in everyday usage" and "how specific a concept is this"? This value allows both more accurate interpretation of input terms passed to the search engine ("what is more likely to be meant by this?"), as well as improved ranking of search results, showing users the results that they are more likely to be interested in first (the more specific terms are likely to be more important to the user).

Meanings within the lexicon may also be flagged in several new ways:

Meanings that signify geographical places are marked as "locations". This allows special calculations to come into play in the search engine that are unique to these meanings.

Meanings that are "offensive" are marked, indicating that the general public may find these meanings to be distasteful or vulgar in some way. This flag allows us to give users the option to filter search results that they may find offensive.

Meanings that signify specific "instances" of things are marked. For example, "computer company" is a generic kind of concept, but "Microsoft" describes a unique entity. Knowing when "kind of" children of a meaning are "instances" allows the semantic distance calculations to more accurately estimate the precision of a parent meaning (this is described in more detail later).

The "currentness" of meanings may be noted. Meanings marked as "current" are those that are in some way timely; values surrounding them are more likely to vary over time than other concepts. For example, the word "Monica" might currently imply the meaning "Monica Lewinsky" to a greater degree today than it might will a year from now. By marking meanings that are uniquely likely to change within the near future, the Lexicon may be more easily kept up to date.

Meanings may be marked as "pseudosynsets". This term describes meanings that are either not in common usage because they are highly specific or technical, or that exist within the Lexicon purely for the purpose of forming a parent category for a group of child meanings. An example of the former might be the Latin terms that describe phylum, class, or species within the biological taxonomy. An example of the latter would be the concept of "field sports", which exists mainly for the purpose of grouping similar specific sports together cleanly in the Lexicon, rather than because it in itself is actually an oft used meaning in common usage. By marking "pseudosynsets", more accurate values for semantic distance may be calculated (this is described in more detail later).

Block 115

Each subject, or node, within the directory is given a "location" within the semantic space that is established by the Lexicon. Before a search engine can find anything within this space, targets to retrieve must be placed there. The process is envisioned to be a manual one; editors examine each directory subject node, and decide upon the "meaning" of the subject. However, this process may also be automated.

To specify a node's location in semantic space, one or more individual meanings from the Lexicon are "attached" to the node. These meanings may be grouped together into "synset groups", each of which, in a sense, describes the node's position within a different dimension of semantic space.

For example, a node within the directory that is about "Piano Players" would be assigned the meaning piano player. A node about "Piano Players in Australia" would be assigned two meanings, piano player and Australia. The two concepts represent two distinct "synset groups" on the node, as each establishes a location for the node within a different "dimension" of meaning. Another way to look at this example is to say that the node represents the "intersection" of the concepts of piano player and Australia—it is where the two ideas come together within the directory.

Extending this example, consider a node that is about "Piano Players in Australia and New Zealand". In this case the meanings Australia and New Zealand might both be placed on the node, but grouped together in one "synset group", because the combination of the two describes the node's location within the "geographical location" dimension of meaning. Another way to look at this example would be to say that the node is about the intersection of the concept of piano player with the union of the concepts Australia and New Zealand. The purpose of this synset grouping is solely to provide more accurate positioning of the node within semantic space, and a more accurate reflection of the specificity of the node, both of which result in improved search engine retrieval.

The lexicon is updated and further developed primarily when ascribing nodes to a location in semantic space is impossible because the needed meaning does not exist in the semantic space. Thus, blocks 110 and 115 can be thought of as implemented in complementary fashion to one another.

Block 120

If the semantic space laid out by the lexicon developed as described with respect to block 110 is to be effectively used, the concept of "distance" from one meaning to another within this space must be defined. The input to this portion of the process is the lexicon itself and the output is a table of information that details the distance from each meaning to each other meaning that falls within a certain "radius of semantic closeness".

The closeness of meanings is affected to a large degree by their perceived "precision". For example, we can guess at how close the concepts of "sports" and "baseball" are based on the fact that there are many other particular kinds of sports under "sports" than baseball. As baseball appears to be one of many, it's connection to the concept of "sports" is not as strong as if, say, there were only two sports in the world, and baseball was thus one of only two possibilities for what is meant by "sports". This idea is reflected in an algorithm that estimates the "kind of" and "part of" precision of a meaning based on the total count of its descendants, following "kind of" and "part of" relationships. In these calculations, meanings marked as "instances" are biased against, as they would tend to incorrectly dilute the precision of a concept otherwise.

Differences in estimates of precision are used to generate a semantic distance between two directly connected meanings only when a connection strength has not been set. Manual settings override the calculated estimates; thus the semantic distance results come about from a combination of automatically estimated connection strengths, and strengths that have been manually set.

The process for discovering meanings that are semantically close to a specific meaning involves a traditional breadth-first search outward from the origin meaning. Neighboring meanings in the network of nodes are explored in an outward seeking fashion, and distance from the origin is tracked. When a certain radius has been reached, the search stops. Intricacies in this search include the following:

1. A "scaling factor", somewhat like a "velocity" is tracked as the search spreads outward. This scaling factor multiplies the perceived distance for a single jump. One net effect of this factor is to reduce the perceived distance to meanings that are close, thus the drop-off of distance is not linear as the search expands. This is a result of an increase in scaling factor based linearly on the previous jump distance.

2. The scaling factor is also modified by a change in direction of the search within the lexicon hierarchy. For example, a jump down to a child from a parent that was previously jumped up to from another child, incurs a scale factor increase penalty. Similar penalties arise from jumps down then up, from jumps in "kind of" that occur after "part of" (and vice versa), and from combinations of these.

3. Lateral "bond" type connections also incur scale factor penalties, based on the set distance of the jump.

4. "Psuedosynset" and "instance" meanings are treated in a special way. When used as the origin, they imply that the search for related meanings should be within a smaller radius, as their own greater degree of exactness imply a more specific kind of search for meanings is called for. Thus the search does not expand as far; this is controlled by starting the search with a higher scaling factor. Additionally, a different measurement of precision is used, which includes detailed terms that are otherwise excluded from the standard precision algorithm initially. (Alternately, if the origin meaning is not a pseudo-synset or instance meaning, then the standard precision values excluding count of descendant pseudosynsets are used.)

Block 130

Once distances between meanings within the Lexicon have been determined, and target nodes within the directory have been given fixed positions within the semantic space described by the Lexicon, it is possible to generate scores for all nodes that fall close to each individual meaning. Precalculating these scores ahead of time allows a much quicker response time to actual searches. The inputs to this process are the lexicon, the table of relatives of each meaning, showing semantic distances, and the data that details what meanings have been attached to what nodes. The output of this process is information describing what nodes are close to each given meaning, and a "score" for that closeness, which is a direct reflection of the semantic distance from the origin meaning to the meanings that have been attached to the node. Other factors that affect the pre-calculated node scores for a meaning are the number of meanings attached to the node, and the "commonness" value of the meaning in question.

An additional element of this pre-calculation step involves the creation of tables of information that allow very fast comparison between meaning when determining which nodes are hit by multiple meanings simultaneously. For this, bitmapped information that reflects a compressed version of the node-meaning score information is generated. Essentially, if a meaning has any score whatsoever for a particular node, a single bit is set to 1 in a binary field, marking that node as hit. By comparing the "bitmaps" for two meanings against each other, a quick assessment of "combination hits" can be made—it is simply a process of performing a bitwise AND operation on the two bitmaps.

Because an uncompressed bitmap for every meaning would be an unmanageably large amount of data, which would also require a lot of processing time to analyze, the bitmap data is compressed. There are two levels of compression, each a level 8 times more condensed than the last. In the first level of compression, a single bit represents a set of 8 nodes. If a meaning has a score for any of these nodes, the bit is set. In the second level of compression, each bit corresponds to a set of 64 nodes, in the same way.

Storing the bitmap information in this way allows large chunks of empty raw bitmap data to be ignored, resulting in a much smaller data set. In addition, the bitwise operations performed on these bitmaps can be done with greater speed, because detailed sections of the bitmap data do not have to be examined unless the higher-order compressed version indicates that there is information of value present there.

Retrieval

Block 140

While pre-processing and information organization may be an on-going process, at anytime where at least a partial table of scores for nodes is available, the user can then input a specific search term as he/she would when using the conventional search engine.

When users use the search engine to find subjects within the directory, the search engine conducts two phases of processing. The first phase, interpretation, involves analyzing the user's input so that the meanings that the user desires can be identified (see block 150 description). The second phase, collection and ranking of results, involves the collecting of nodes that have good scores for the desired meanings, and ordering them based on predicted relevance (see block 160 description).

Block 150: Interpretation Phase

There are two key inputs possible for a search: an input string, and a set of known meanings. Either, or both, may be received and processed for results. The input string is simply a set of words that the user types into a search box and submits for query. An interpretation of these words is made, to map words to probable desired meanings. In addition to, or instead of, the input string, a set of meanings that are known ahead of time to be of interest, may be passed to the search engine for query. These require less processing, as plain words to not have to be mapped to meanings, as they are already predefined. Meanings passed to the engine in this way are called preconceptions.

The process for interpreting the input string begins with stemming, or morphing, of the individual words in the string. This involves mainly an attempt to reduce words perceived as being plurals to their singular form. This is necessary because word mappings to meanings within the Lexicon are stored in singular form only, except in special cases.

Next, all possible combinations of words (and their morphed variants) are examined for possible matches to meanings. Larger numbers of combined words are tested first, to give preference over individual words (for example, "United States" must take precedence over analysis of "United" and "States"). Partial matches with meanings are possible, so that "Rocky Horror" might bring up a match for "Rocky Horror Picture Show", for example.

As the set of possible meanings is being compiled, probabilities are assigned to each. These values reflect the likelihood that the user really means a certain concept. Because many words have multiple meanings, probabilities for implied meanings for words may be manually or automatically pre-assigned. These values are used in this phase of the engine processing, in order to estimate what meanings are most likely implied by particular search words. Other factors that affect the probabilities given to meanings are: was the meaning matched by a morphed word or the word in its "pure" form (favor pure forms); was the meaning only partially matched the input word(s) (if so, reduce probability); was the meaning the result of a match on multiple words (if so, increase probability); the commonness of the meaning implied (favor more common meanings).

Another kind of "concept induction" is applied to the analysis at this point. All implied meanings are examined and compared against each other, so that relationships might be discovered. If there is a connection between two meanings, those meanings will receive a bonus to their probability factor, because the implication is that those particular meanings of the user's words were what the user wanted. (These comparisons actually occur between the all the meanings that are possibilities for one search word against all those for each other search word). Thus if the user enters "Turkey Poultry", the meaning of "turkey" as a kind of food will receive a bonus, because a connection between a meaning deriving from "poultry" relates to this particular meaning of "turkey". This is extremely valuable in tuning meaning probabilities, because without this weighting, for example, the meaning "Turkey, the country" might have been preferred.

Lastly, a set of simple plain words is compiled, based on the raw input terms, and given weighting factors based on whether or not meanings were implied by those terms. These plain words are used for a more standard word-matching search, that is conducted concurrently with the meaning-based search. Weighted by a lesser degree than meaning-based results, hits on subject nodes based on these plain words do play a factor in the scoring of nodes in the second phase of the search.

Processing of preconceptions in the Interpretation phase is simpler, as the meanings that the user desires are passed as direct input to the engine. The only processing that is necessary is a weighting on the importance of these meanings, which is applied by analyzing the commonness of the meanings in question.

One additional factor remains to be mentioned in the Interpretation phase. Certain meanings may be considered as "required" in the search results. Users can specify they want to require certain meanings to show up in the results by putting a plus sign (+) before the appropriate word or phrase in the input string. Additionally, preconceptions may or may not be sent to the engine as "required" meanings. By default, the engine performs a logical OR operation on all input meanings. When meanings are "required", it implies that a logical AND should be performed on these terms.

Block 160: Collection and Ranking Phase

Once the meanings of interest to the user have been determined in the Interpretation phase, and given appropriate weightings based on the likelihood of value, actual nodes that relate to these meanings can be collected and ordered for presentation.

This phase begins with the collection of bitmap information on the desired meanings. Only meanings that have more than a set number of node scores have bitmap information, these meanings are called popular. (Exception: if the search is being performed for a single input word, these bitmaps do not have to be collected.) Discovering bitmap information stored for meanings indicates to the engine their popular state.

Next, the "top scoring nodes" for all meanings are queried from the pre-calculated score information. Meanings that were not found to be popular have their bitmaps constructed during this stage, as all of their scored nodes will be present in this "top scoring" category. Unless the search is to be a special AND operation between terms, we begin to compile a list of potential node results from these score table queries. (If the search is a pure OR, these results are likely to be useful. If an AND is to be done, the chances are good that most of these results will be filtered out, therefore all node scoring is performed later in this case.)

The bitmap analysis phase comes next. Behavior of the engine here varies widely between cases where different kinds of terms are required/not required. In general, the point of bitmap analysis is for either of the following reasons, or for a combination of them:

Find out what nodes are hit by more than one meaning, because they are likely to yield very good scores due to the combination hit factor. Many of these nodes will not have shown up in the individual meanings' "top scoring nodes" lists, and therefore would have been missed had we not looked specifically for combinations.

Filter out only nodes that show up on required meanings, because a logical AND between terms is being performed.

Bitmap processing involves a series of bitwise OR and AND operations, which occur in two passes. Processing is done first on the highest level of compression, to get a rough idea of what areas of the bitmaps need to be examined in more detail. Next the detailed bitmap information of interest is queried from the database. Finally, the logical processing is run again at the uncompressed level of detail.

The result of the bitmap processing is a set of nodes of interest. These nodes are queried from the score tables for all meanings of interest and added to the list of potential results nodes.

The next stage is actual scoring of node results. Node scores result primarily from a multiplication of the score for the node for a given meaning and the probability factor for that meaning that came out of the Interpretation phase. Additional bonuses are given to nodes that are hit by a combination of meanings. The "portion of meaning" of the node is also considered. For example, if a node has three attached meaning groups (synset groups), and two of those meanings were queried by the user, we can say roughly that ⅔ of the concept behind this node was of interest to the user. Thus this node is probably of less interest to the user than one whose concept was hit more completely. Other special considerations are also introduced, such as the favoring of nodes that are hit "perfectly" by meanings, over those that were separated at all by some distance in semantic space.

It should also be mentioned here that some additional tricky processing comes into play when dealing with the simple plain word hits, whose processing is concurrent to the meaning-based search processing that this paper focuses on. Special processing for plain words is performed that involves searching for matches of different plain word search terms on the same sentences on the subject node pages that are to be pulled up as results. Additionally, different weighting comes into play based on where plain words appear—for example, a word showing up in the title of a node is valued more than the appearance of that word later on the page.

After scoring, all that is left in anticipation of results presentation is a sorting of the node results by score, the selecting out of those nodes whose scores merit presentation, and the classification of these nodes into groups of "strong", "medium", and "weak" score values.

Block 170

As mentioned above, users interact with the search engine directly by entering an input string into a simple input box on a Web page. In a standard initial query, whose span is the entire directory, this string is passed to the engine for interpretation without any preconceptions as parameters. Results spanning all subjects in the system are retrieved and presented to the user so they may subsequently navigate to those areas of the directory.

Once the user is on a particular subject page of the directory, however, they also have the option to perform a narrow search. Essentially, this is a search for subject matter that is "close in meaning" to the subject page they are currently on. These kinds of searches are performed by the passing of the meanings attached to the given subject to the search engine as preconceptions, along with the user's input string. In this case, the preconceptions are designated as required, and the input string terms, as a whole, are also treated as required terms.

Whenever a user performs a search, the node results are preceded by a description of what meanings were actual searched on. Because these meanings are often the result of the interpretation of the user's input string, and may include multiple possible meanings for given words, the user is encouraged here to specify exactly what meanings they wanted, and to search again. This second search is called a refined search. Essentially, the user is presented with a set of checkboxes, each of which corresponds to a possible intended meaning. The user refines the search by simply checking off the meanings she wishes to search on, and clicking on "Search Again".

A refined search is passed to the search engine as a set of non-required preconceptions, thus an OR operation is performed on all of the meanings. Increased functionality in this part of the system, including the option to set specific meanings as "required", as well as the ability to include plain word searching in refined searches, is planned for the near future.

Block 180

Node results, i.e. target documents, having the desired meaning or closeness in meaning to the concept searched for may then shown to the user. The user in turn may navigate the nodes presented him or refine his search in accordance with block 170 described above. Once nodes are collected and ranked in accordance with block 160 (also described above), then they may shown to the user as results with the highest ranked nodes appearing first. This concludes the retrieval stage where the user has now successfully navigated to the site of interest. As compared with conventional Web search engines and directories, searching in a meaning-based fashioned as described above allows users to more quickly locate relevant and useful documents or sites.

Figure 2:
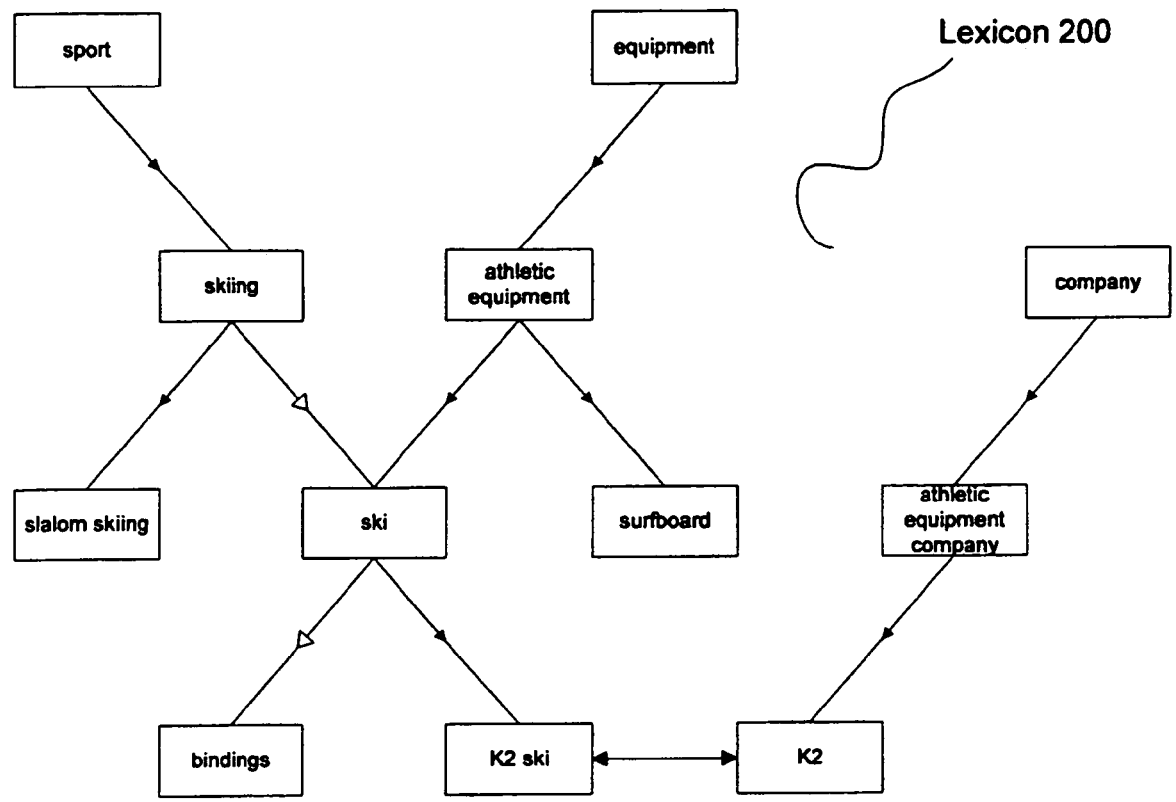
FIG. 2 illustrates a portion of a relationship based lexicon employed in one or more embodiments of the invention.

FIG. 2 illustrates a portion of a relationship based lexicon employed in one or more embodiments of the invention.

FIG. 2 shows one portion of a sample lexicon 200 which differs from conventional lexicons by adding a lateral bond ("bind") connection between elements. The boxed elements in FIG. 2 represent meanings within the lexicon and collectively, along with the relationship connections between meanings can be viewed as defining a semantic space. The three basic relationship types "part of", "kind of" and "bind" are represented by differing line types in FIG. 2, a legend for which is drawn thereon.

The relationships between elements may take on many forms and can become quite complex, but for ease of illustration, a simple is shown in FIG. 2 dealing with skiing.

Starting with the branch for "sport", "skiing" is defined in the lexicon 200 as a kind of "sport". The word "ski" typically, in its noun form, can be thought of as related to "skiing" in that it is a part of "skiing" as shown in FIG. 2. "Slalom skiing" is a type of skiing and hence a kind of connection is shown between it and "skiing". "Bindings" are a structural attachment on a ski, and hence it is assigned a part of connection with "ski". The example of a specific brand of ski, "K2 ski," is given to show how it is in a "kind of connection with "ski".

Unique to the lexicon developed for the invention, "K2 ski" is also assigned a lateral bond showing a conceptual commonness with the manufacturer of the ski "K2" which lies in the "company" branch. The company branch has as child "athletic equipment company" as a kind of "company." "Athletic equipment company" has as its child in turn the "K2" company.

Considering "ski" once again, "ski" is also a child of the "equipment" branch which has "athletic equipment" as a kind of "equipment" and ski as a kind of "athletic equipment". "Surfboard" is related to "ski" in that it too is a kind of "athletic equipment". Target documents or nodes within a subject directory may be "placed" or "located" by human intervention" into the semantic space as defined by lexicon 200. A website that sells skis or has information about skiing destinations would fall somewhere within the defined semantic space based upon its focus of content.

Figure 3:
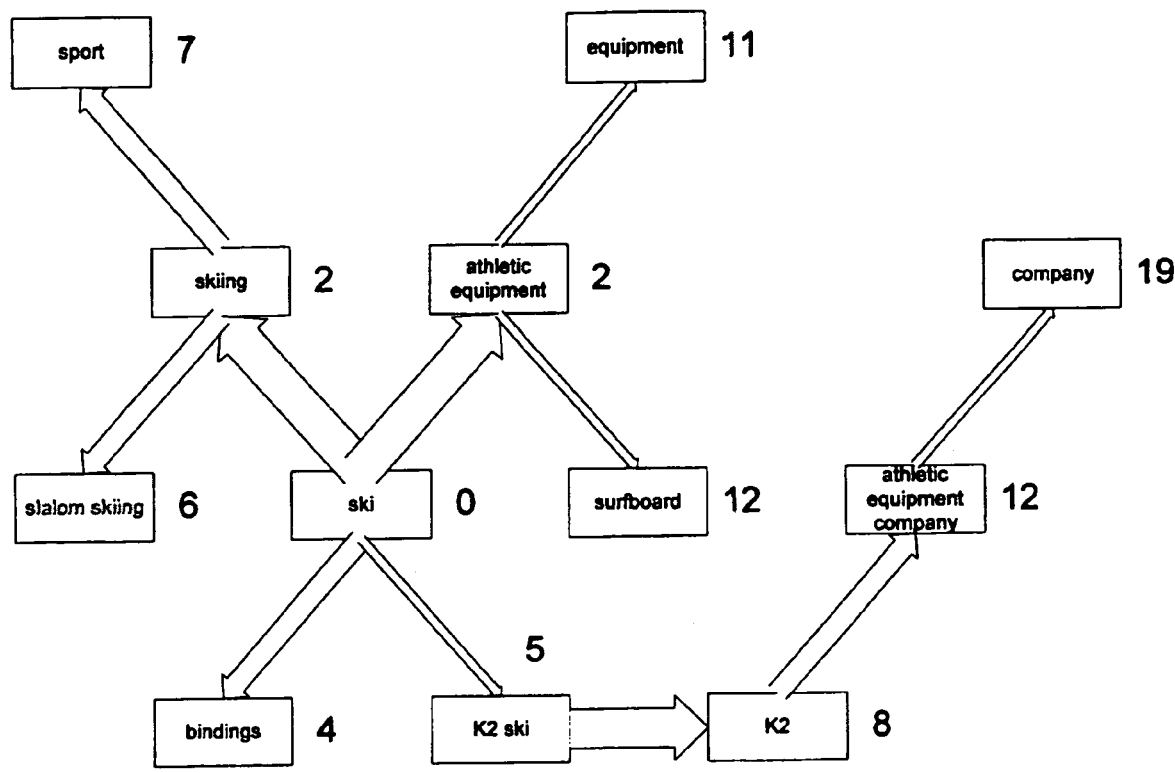
FIG. 3 illustrates the concept of bond strength and semantic distance employed in one or more embodiments of the invention.

FIG. 3 illustrates the concept of bond strength and semantic distance in one or more embodiments of the invention.

Using the same exemplary lexicon 200 of FIG. 2, FIG. 3 illustrates how distance and closeness of meaning between meanings can be quantified within the semantic space. Distances are shown between the element "ski" and all other elements within the semantic space. Using three classes of bond strengths the degree of closeness between meanings may be discovered. A "strong relationship" exists between "ski" and "skiing" as does between "ski" and "athletic equipment." Between "skiing" and "sport" there is a weaker than strong relationship known as a "medium relationship". This is because when you think of the root term "skiing" one doesn't quickly think also of "sport". Going from "ski" to "skiing" however, the average person would more likely associate or think "skiing" if given the term "ski". The direction in the arrows in the bond strengths, indicates the direction of association. "A→B" in FIG. 3 means that if you are given A, how likely is it or closely would one associate the meaning B. Going the other direction between the same two elements may produce a different bond strength. A "weak relationship" would be displayed between "ski" and "K2 ski" (when you think of "ski," "K2 ski" doesn't closely come to mind). However, if one were to go from "K2 ski" to "ski" this might be construed as a strong relationship since one would naturally associate "ski" if given "K2 ski".

FIG. 3 also shows semantic distances between elements. "Ski" and "skiing" have only a distance of 2 between them while "skiing" and "sport" have a distance of 5 (7–2). The distance between "ski" and "sport" is 7. When travelling from parent to child or vice-versa, the distances can be simply added/subtracted but when changing the direction of travel, a penalty may be imposed upon the distance calculation. Take for example the distance between "ski" and "athletic equipment company". Judging merely on a linear basis, the distance might be 12. But since the path from "ski" to "athletic equipment" switches direction twice (it starts down to "K2 ski" and then across the lateral bond to "K2" and then up to "athletic equipment company") a penalty or scaling factor would cause the distance between "ski" and "athletic equipment" to be much larger than just 12 especially given their lack of connectedness. As described above penalties may be added when the direction of traversal is switched or when a lateral bond is crossed. Meaning-by-meaning, distances between elements may be calculated and stored for future use in search retrieval.

Figure 4:
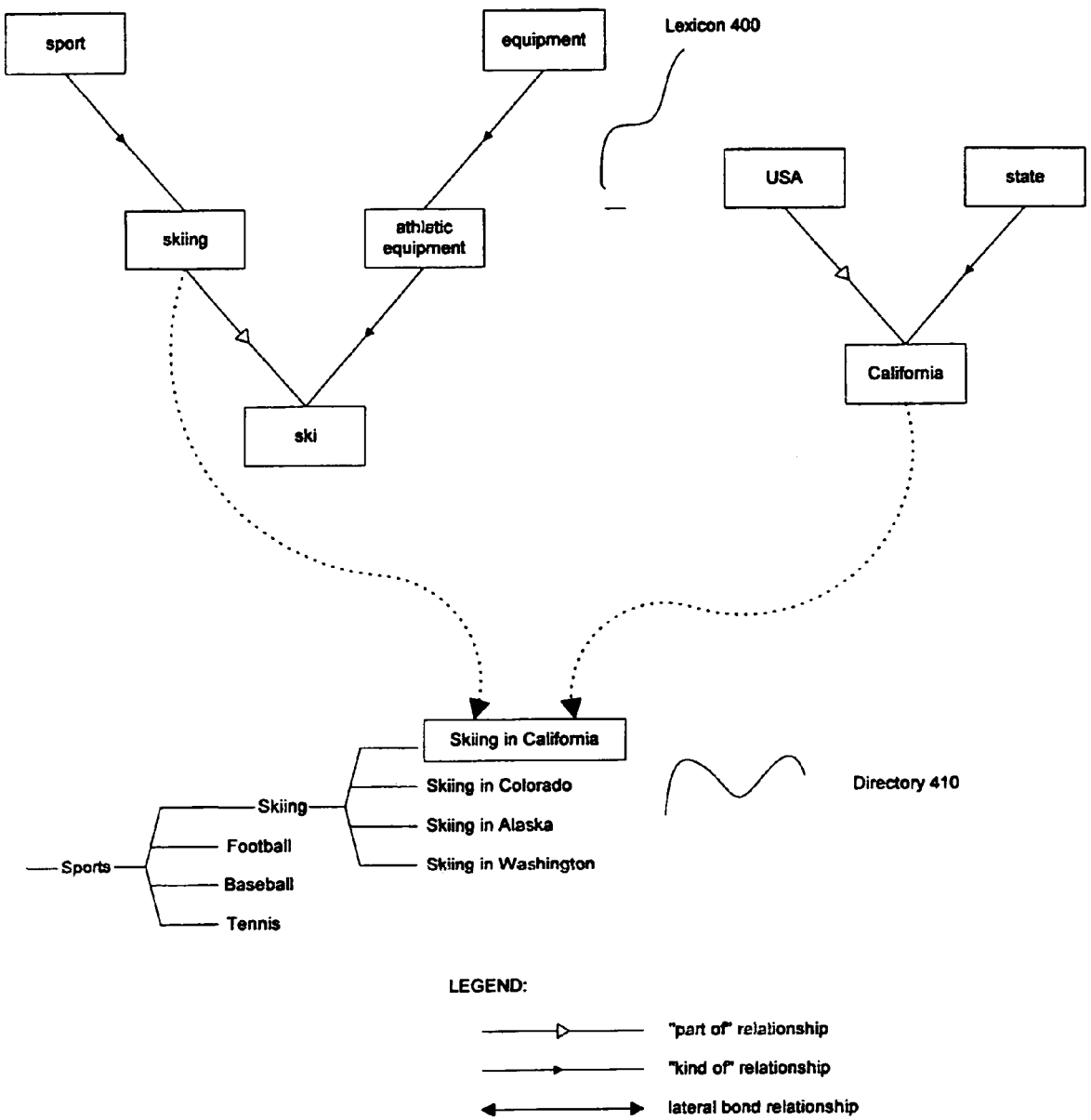
FIG. 4 illustrates the application of synsets to categories in a subject directory tree.

FIG. 4 illustrates the application of synsets to categories in a subject directory tree.

Given a lexicon 400 (similar to lexicon 200) and a subject directory 410, FIG. 4 illustrates how "Skiing in California" may be assigned a location in the semantic space. In the subject directory 410, the subject Sports has associated with it the child subjects of "Football", "Skiing" "Baseball" and "Tennis." The subject "Skiing" has its own children "Skiing in California", "Skiing in Colorado" "Skiing in Alaska" and "Skiing in Washington". In the semantic space "Skiing in California" would be assigned to "skiing" as well as to "California". The node "Skiing in California" would thus be ascribed the element "skiing" as well as "California" such that both meanings and related meanings would be available as additional refinements. For instance, consider "Los Angeles", a city in California. If another node of directory 410 described "Things to do in Los Angeles", by virtue of the connectedness of "Los Angeles" as part of "California" within the semantic space, this node may also be presented to the user when a search for "California" or "skiing in California" is performed even though none of the literal sub-strings match with the node. The meanings or closeness in concept would bring such relevancy of nodes to the forefront.

Figure 5:
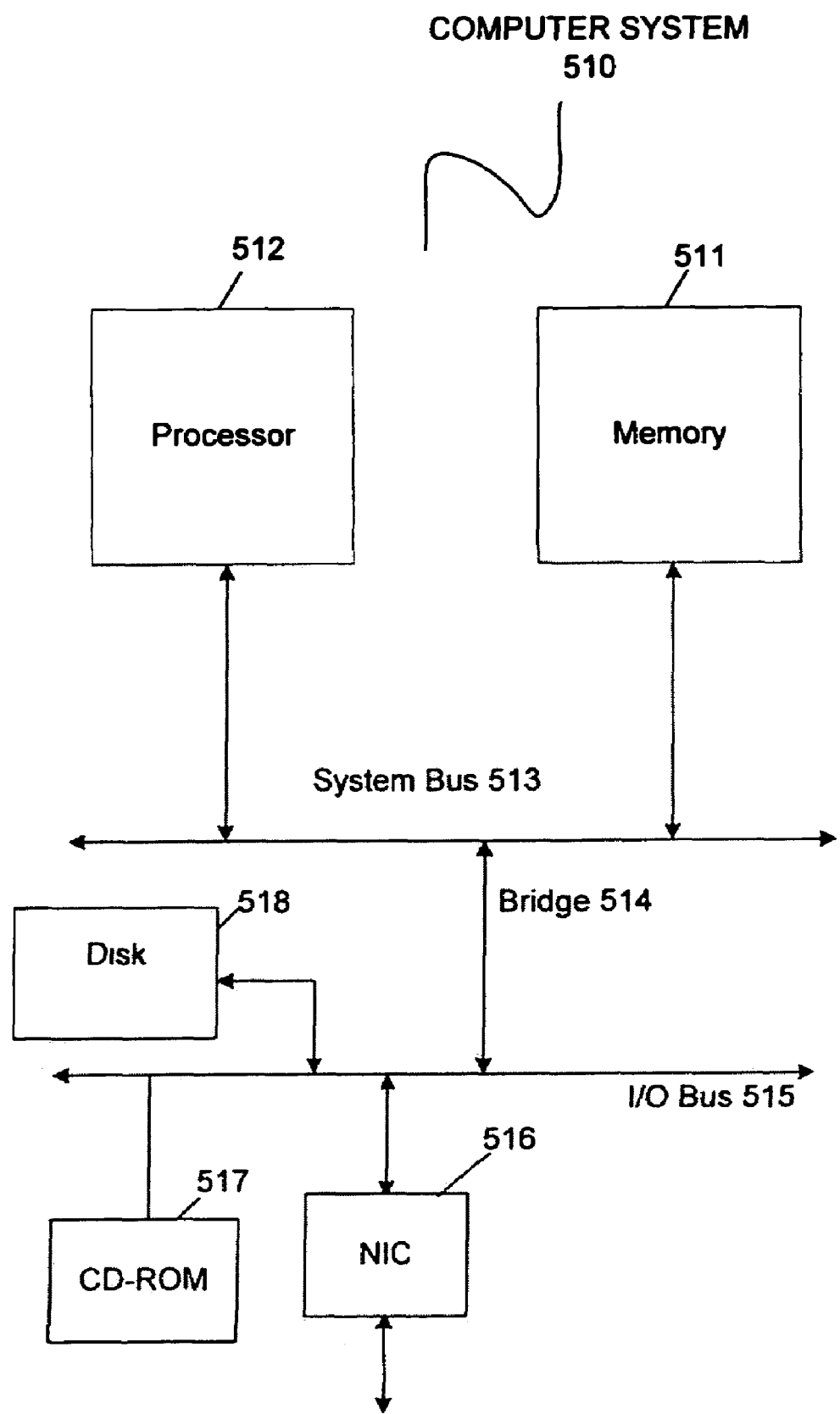
FIG. 5 is a system diagram of one embodiment of the invention.

FIG. 5 is a system diagram of one embodiment of the invention. Illustrated is a computer system 510, which may be any general or special purpose computing or data processing machine such as a PC (personal computer), coupled to a network 500.

One of ordinary skill in the art may program computer system 510 to act as a meaning-based search engine. This may be achieved using a processor 512 such as the Pentium® processor (a product of Intel Corporation) and a memory 511, such as RAM, which is used to store/load instructions, addresses and result data as needed. The application(s) used to perform the functions of a meaning-based information organization and retrieval system may derive from an executable compiled from source code written in a language such as C++. The instructions of that executable file, which correspond with instructions necessary to scale the image, may be stored to a disk 518, such as a floppy drive, hard drive or CD-ROM 517, or memory 511. The lexicon, directory and scoring and distance tables and other such information may be written to/accessed from disk 518 or similar device. The software may be loaded into memory 511 and its instructions executed by processor 512.

Computer system 510 has a system bus 513 which facilitates information transfer to/from the processor 512 and memory 511 and a bridge 514 which couples to an I/O bus 515. I/O bus 515 connects various I/O devices such as a network interface card (NIC) 516, disk 518 and CD-ROM 517 to the system memory 511 and processor 512. The NIC 516 allows the meaning-based search engine software executing within computer system 510 to transact data, such as queries from a user, results of such queries back to users that present meaning-based results and refinements to searches performed, with users connected to network 500. Filters and other meaning-based search utilities may be distributed across network 500.

Many such combinations of I/O devices, buses and bridges can be utilized with the invention and the combination shown is merely illustrative of one such possible combination.

Figure 6:
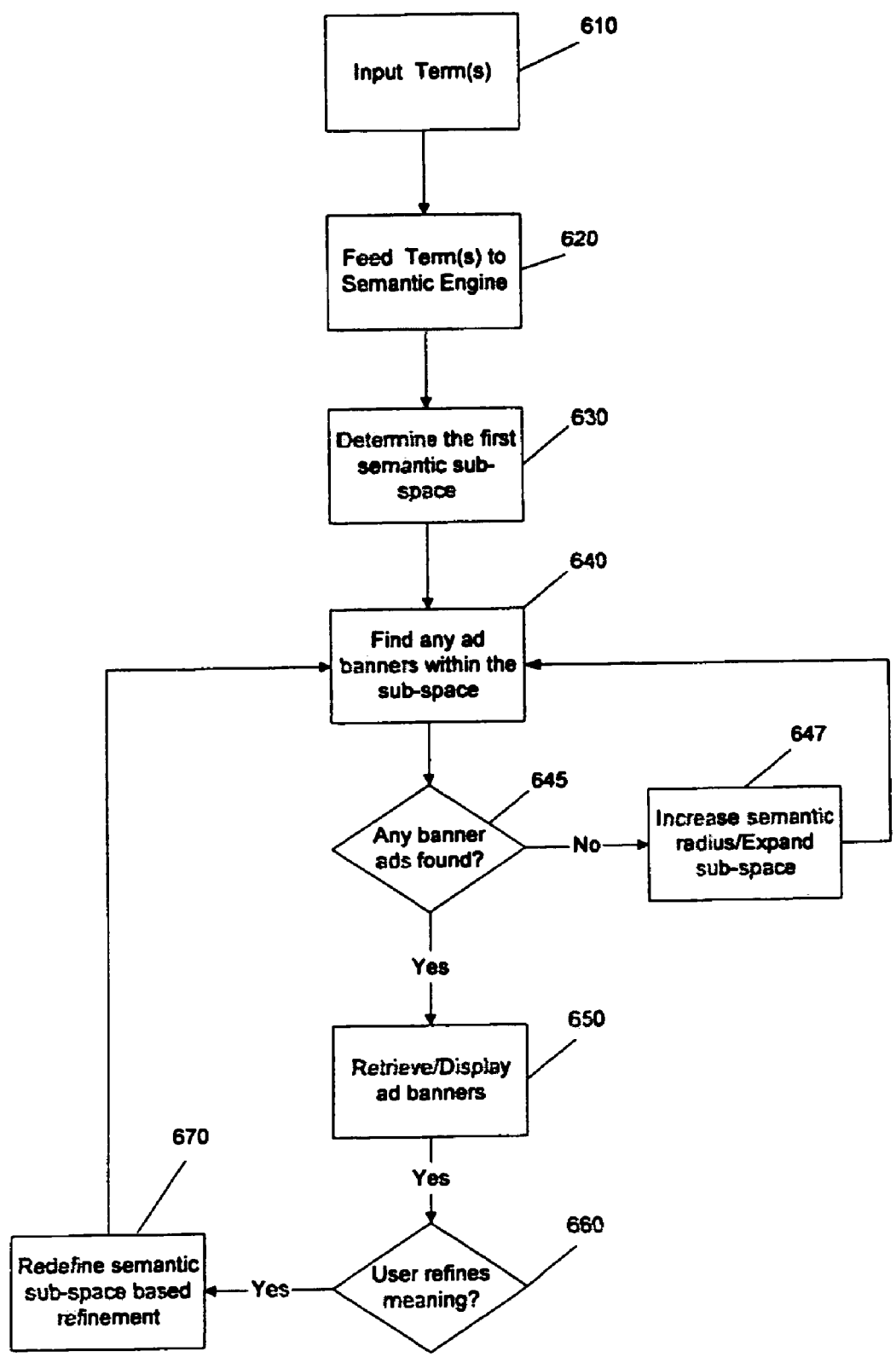
FIG. 6 is a flowchart of meaning-based advertising according to one or more embodiments of the invention.

FIG. 6 is a flowchart of meaning-based advertising according to one or more embodiments of the invention.

Meaning-based advertising may be achieved by placing or indexing ads within the semantic space. As with documents indexed into semantic space, advertisements may be indexed or placed within the semantic space according to their targeted meaning. For instance, an advertisement from a desktop and laptop computer retailer might be indexed at/near a synset for personal computer. This places the advertisement into semantic space such that it would be retrieved according to an input that has a semantic "sub-space" that includes the advertisement's location. An advertisement such as an internet banner ad can thus be accessed or retrieved not merely by a keyword or category, but rather by a semantic concept that may encompass many words, equivalent words and words of related meaning.

For instance, the computer retailer in the above example would be able to place the ad into the synset corresponding to personal computers. By doing so, a search engine or mechanism that utilizes this semantic space may sell the concept of "personal computer" to the advertiser. Instead of a keyword or even multiple keywords the purchase of a concept such as "personal computer" may be much more valuable to the advertiser and the potential viewer of the ad. Input words such as "PC", "laptop" "desktop" and "workstation" would be related closely with one another and thus fall in close proximity to one another. As a result, an input of any of these words to a search engine or filter would result in retrieval of the same banner ad. Further, depending on the radius of semantic distance used to define the sub-space from the synset "personal computer", many other less closely associated words (meanings) may also trigger retrieval of the same advertisement. For instance, the word "hardware" in one of its meanings indicates devices that are used in a computing or communications environment. While "hardware" is not equivalent to "personal computer," within a semantic space, "personal computer" may be related to the synset for "hardware" as a type of "hardware" and fall close enough in semantic distance such that an input of hardware might retrieve the same advertisement as would an input of "personal computer". This procedure, as it relates to a searching utility or engine is described below.

First, a user enters a search term (block 610). This search term is then fed to the search engine or filter that differentiates based on semantic relationships (meanings) in a lexicon (block 620). One example of a semantic engine is the meaning-based differentiator described above. A meaning-based search engine then determines the sub-space in the whole semantic space that encompasses the search term. The semantic sub-space is determined by first fixing a point in semantic space closest to or at the synset (meaning) that best suits the search term. After fixing this point in the entire semantic space, all elements of the semantic space within a certain radius of semantic distance will comprise the semantic "sub-space" governing the term that was searched (block 630). Once the semantic sub-space has been determined, then ad banners positioned within the sub-space can be found (block 640). This assumes that prior to the search banner ads have been indexed into semantic space.

If there are no banner ads within the semantic sub-space (checked at block 645), then the radius of semantic distance can be increased (block 647) or by other means, the semantic sub-space can be expanded upon until banner ads are found. Once banner ads are found within the original or expanded semantic sub-space these ads may be displayed (block 650). If there is more than one banner ad within the semantic sub-space and only one ad is to be displayed then the ad positioned closest in semantic distance (most closely associated) to the search term can be displayed. In an alternate embodiment, if no documents are found within the original semantic sub-space, it may be desirable to retrieve no ads. Also, where the semantic sub-space is expanded, it may be desirable to terminate the process of expanding the sub-space beyond a certain threshold since the likelihood of a relevant ad may decrease with such an expansion.

In accordance with the operation of a semantic or meaning based search, the user may be able to select a given meaning from a set of possible meanings (block 660). If the user selects a particular meaning or word context, then the semantic sub-space is redefined (block 670) and new banner ads can be found (block 640). While FIG. 6 and other embodiments refer to advertisements or banner ads, these principles can be applied to retrieval of any documents, images, sounds or other data, and is provided as one example finding documents based on their semantic content or purpose.

Figure 7:
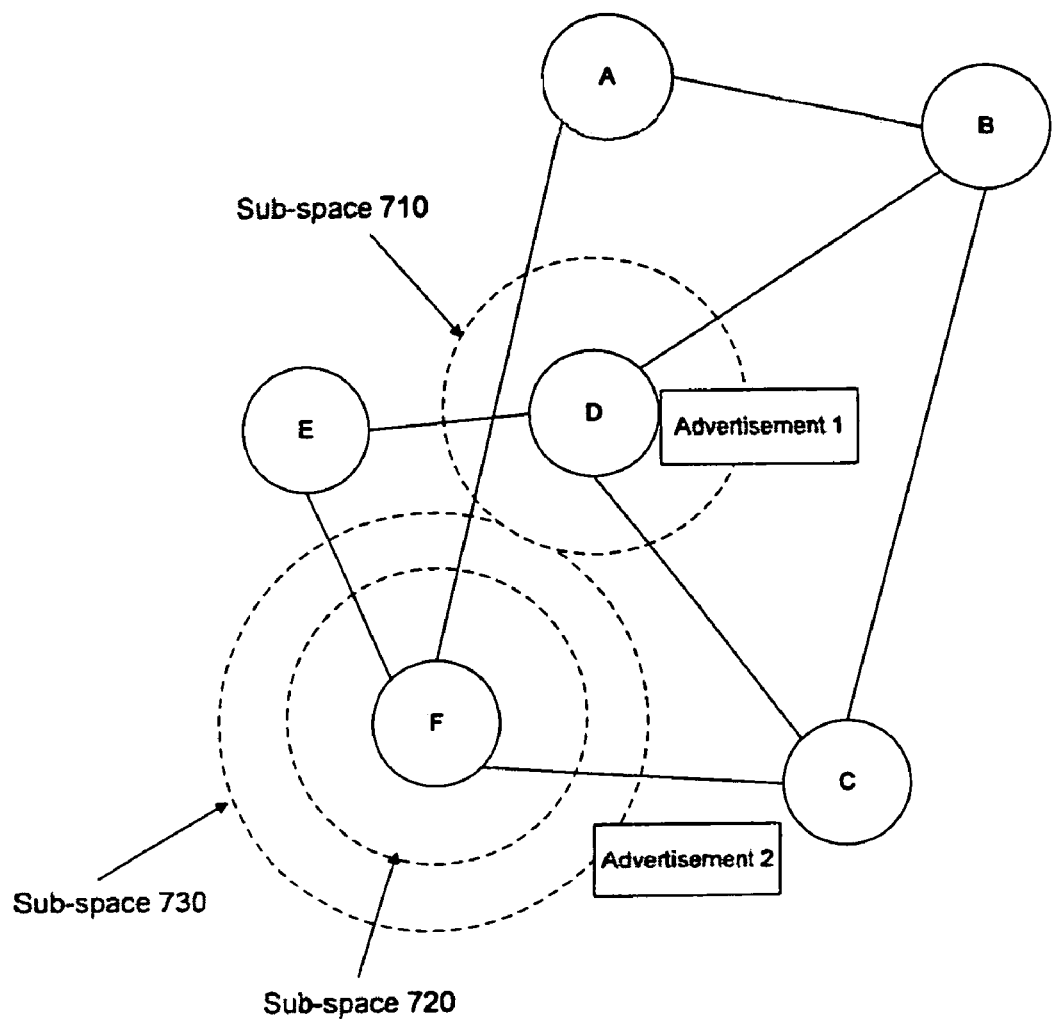
FIG. 7 illustrates advertisements within a semantic subspace.

FIG. 7 illustrates advertisements indexed within a semantic space.

The semantic space 700 of FIG. 7 includes six nodes or synsets A, B, C, D, E and F. The semantic space 700 is illustrated for convenience as a two dimensional space with connections between various nodes showing their inter-relationship. An actual semantic space may be thought of as having N-dimensions, given the complex possible associations between synsets, words, subjects and meanings. In general, the further away one location in the space from another, the less related or associated semantically are the nodes. There are two advertisements, Advertisement 1 and Advertisement 2 indexed within the shown semantic sub-space at various locations. This positioning of documents such as advertisements may be made manually or by some automated process.

Several semantic sub-spaces are also shown. These sub-spaces are triggered by an input of a term or meaning that equates to a synset. A user or mechanism inputting a term that is associated with the node D will generate a semantic sub-space 710. With sub-space 710 thus defined, an ad, Advertisement 1 is found immediately. Semantic sub-space 710 is a "first" semantic sub-space which is an initial guess at a given semantic radius about the node D. In this case, an advertisement was discovered contained therein without any expansions of the space. Consequently, taking the example of a search engine portal website, a user visiting that website that enters a term equivalent to the node D would trigger retrieval of Advertisement 1.

By contrast, a first semantic sub-space 720, determined by an input term associated with node F, contains no advertisements to retrieve. As a consequence, in one embodiment, the semantic radius about the node F may be increased until an ad is found. In this instance, the semantic radius about node F was increased to give an expanded sub-space 730. The semantic sub-space 730 contains Advertisement 2. Thus, subject to an expansion from the first semantic sub-space 720, a user entering in a search term associated with node F will retrieve Advertisement 2. Unlike traditional keyword advertising, input of related meanings may also retrieve the same Advertisement 2. For instance, an input term associated with node C would likely also retrieve Advertisement 2, since both node C and F are related or connected concepts.

Figure 8:
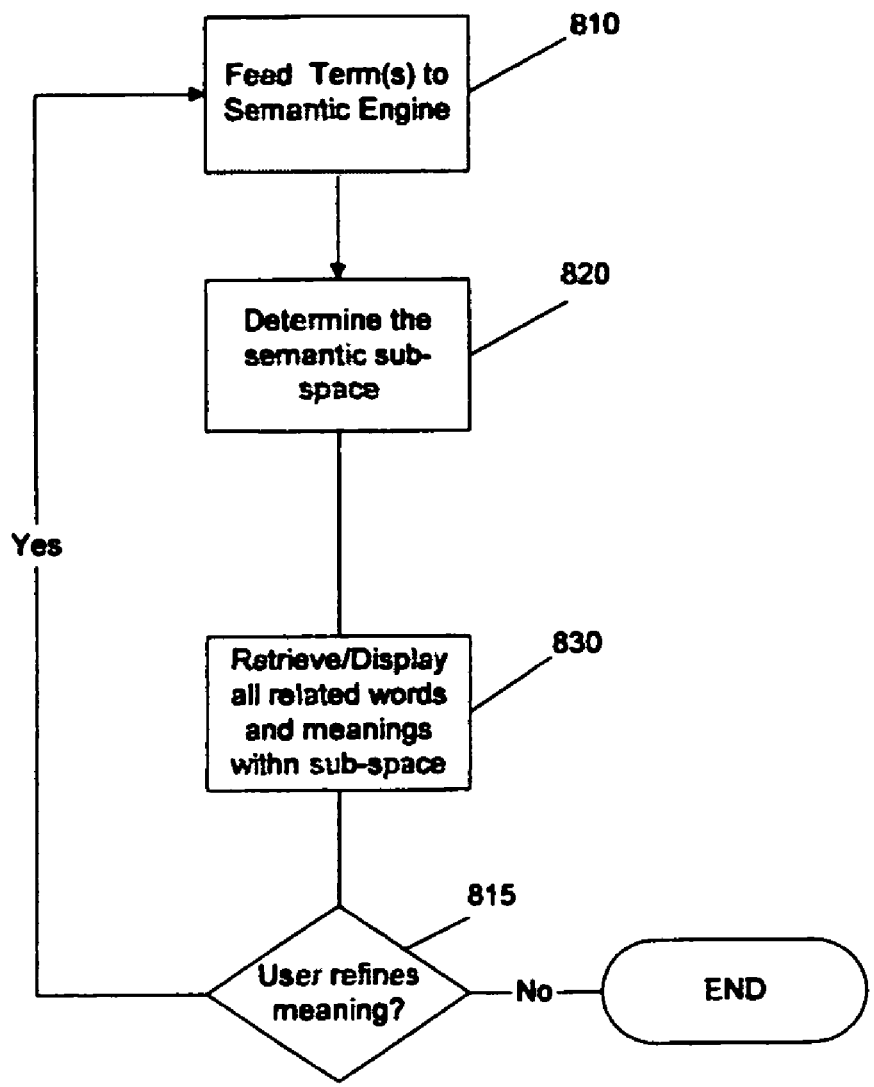
FIG. 8 is a flowchart of keyword generation by semantic filtering.

FIG. 8 is a flowchart of keyword generation by semantic filtering.

Where a particular web site or other information portal desires to sell keywords to an advertiser as is the traditional practice, both the advertiser and the portal may not know all of the right keywords. Utilizing the semantic space and lexicon of meanings, an entire list of keywords can be generated when starting from a particular term or set of terms that matches even roughly the desired theme. For instance, if trying to find keywords intended for a candy advertisement, then a starting input of "candy" might return a semantic sub-space containing with related and associated words such as "sweets," "chocolate," "licorice," and "toffee". Such keyword or related word generation based upon a semantic lexicon can be applied to other information applications such as word processing and artificial intelligence or the indexing of documents and data. The generation of keywords and related words based upon semantic principles is discussed below.

First, by some mechanism, an input term or phrase is fed to the semantic engine (block 810). In the case of advertising, the advertiser or portal can enter in the input term(s). For other applications, the input may be fed automatically from another document or data source. Using the input search, the semantic engine determines a semantic sub-space encompassing the meaning of the input term (block 820). As with the semantic search engine described above, the keyword generation may be refined based upon the selection of a particular meaning of the input term(s) where the input terms have more than one possible meaning (checked at 815). If the meaning is refined (block 815) the refined term (meaning) is fed back to the semantic engine (block 810). If there are no more refinements to be made, then a new semantic sub-space is determined (block 820). With the semantic sub-space determined, the keywords, related words and meanings that belong to the sub-space can all be retrieved (block 830). This list of related words and meanings can then be displayed to a user.

Figure 9:
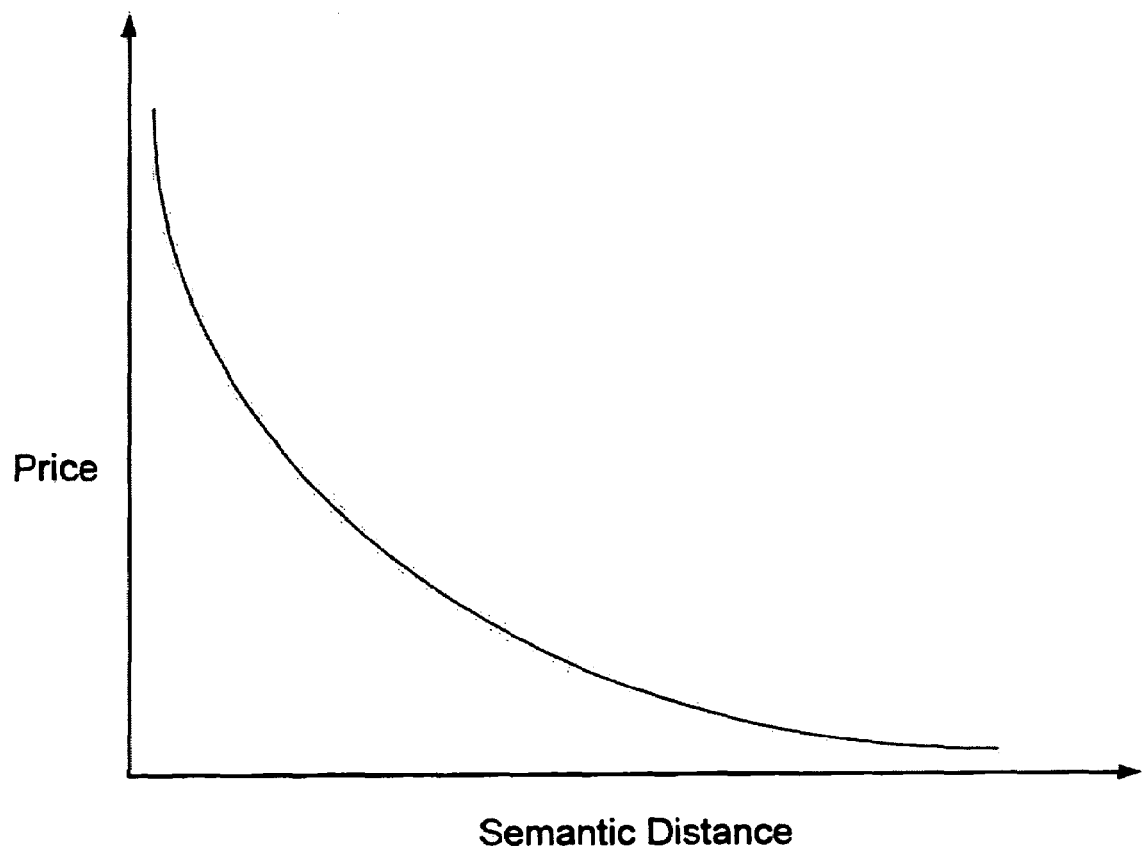
FIG. 9 is a graph of meaning-based advertising pricing according to another embodiment of the invention.

FIG. 9 is a graph of meaning-based advertising pricing according to another embodiment of the invention.

With the aid of semantic space, an advertising campaign may be sold on a variable rather than a fixed cost basis. The cost of the banner ad or other ad when retrieved can be based directly upon the semantic distance. (i.e. degree of closeness in meaning/context) from a key term that was purchased to the input term(s). For instance, if the purchased synset by a candy website for its ad is "candy" and a search term "snack foods" is entered as input, this may still trigger retrieval of the candy website ad (due to a semantic proximity). However, since this user was probably not as interested in a candy website, the ad may not be reaching the as valuable a target user as one who may have entered "candy" as a search term. Even though the ad was retrieved, its display may not be that valuable to the advertiser. In most Internet advertising pricing models, advertisers buy "page views" (the number of times their ad is displayed) without any regard to the relevance of the ad to the user and correspondingly, the effectiveness to the advertiser.

Using semantic space, the relevance of the ad to the user can be determined based upon the input terms. The price of that particular page view can be modified based upon the semantic distance between location in semantic space of the purchased synset and the input term(s). One way to formulate this relation is to say that the semantic distance is inversely proportional to the price of the ad. The farther away in semantic space the input term is to the purchased synset, the less the ad will cost the advertiser. Conversely, the closer in semantic space the term is to the purchased synset, the more the ad will cost the advertiser. This relationship is demonstrated in the graph of FIG. 9 which plots semantic distance against the price of the ad to the advertiser. The graph of FIG. 9 and the inverse relation described above is one of many possible formulations of variable pricing according to semantic relationship and is merely illustrative. Other factors may include the path through semantic space, the type of semantic relationship between the term and purchased synset and the presence of other ads within the same semantic sub-space.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A method, comprising:
   organizing advertisements according to their meaning into a lexicon, the lexicon defining elements of a semantic space represented by a network of interconnected meanings;
   receiving a concept;
   determining one or more concepts close in meaning to the received concept;
   identifying one or more advertisements in the semantic space related to the received concept and the one or more concepts close in meaning to the received concept based on meanings of the advertisements; and
   transmitting for display the one or more advertisements based on an order, the order corresponding to a relationship between monetary values determined for each of the one or more advertisements identified as related to the received concept and the one or more concepts close in meaning to the received concept.

2. The method of claim 1, wherein the order is additionally based on a predicted relevance of the one or more advertisements to the received concept.

3. The method of claim 1, wherein the order is additionally based on a descending predicted relevance of the one or more advertisements to the received concept.

4. The method of claim 1, wherein the monetary values are prices associated with viewings of the one or more advertisements.

5. The method of claim 1, wherein the order is additionally based on a semantic distance from the one or more advertisements to a meaning in the semantic space associated with a received concept.

6. The method of claim 1, wherein the order is additionally based on a degree of closeness in meaning of the one or more advertisements to the received concept.

7. The method of claim 1, wherein the order is additionally based on a degree of closeness in context of the one or more advertisements to the received concept.

8. A method comprising:
   organizing advertisements according to their meaning into a lexicon, the lexicon defining elements of a semantic space and represented by a network of interconnected meanings;
   receiving an input term;
   identifying a first point in the semantic space associated with the input term based on an interpretation of potential meanings of the input term;
   determining a first semantic sub-space that includes all of the elements of the semantic space within a predetermined radius of the first point;
   identifying, in the first semantic sub-space, an advertisement proximate in semantic distance to the input term, wherein the semantic distance identifies how closely related the advertisement is to the input term; and
   providing the advertisement in response to the input term.

9. The method of claim 8, further comprising:
   receiving an indication of a particular meaning;
   identifying a second point in the semantic space associated with a particular meaning;
   determining a second semantic sub-space that includes all of the elements of the semantic space within the predetermined radius of the second point;
   identifying one or more advertisements in the second semantic sub-space; and
   providing the one or more advertisements in response to the input term.

10. The method of claim 8, further comprising:
    identifying keywords and meanings associated with the first semantic sub-space; and
    providing the keywords and meanings to a user.

11. The method of claim 8, further comprising:
    receiving an indication of a meaning to associate with each advertisement from an advertiser associated with each advertisement;
    receiving a cost-per-impression amount associated with the meaning from the advertiser; and
    charging each advertiser the cost-per-impression amount associated with the meaning if the advertisement is provided in response to an input term.

12. The method of claim of claim 11, further comprising:
    modifying the cost-per-impression amount associated with the meaning for the advertisement based on the semantic distance between a location in semantic space of the meaning and the input term.

13. The method of claim 12, wherein the semantic distance is inversely proportional to the cost-per-impression amount.

14. A system, comprising:
    one or more computers; and
    a storage device coupled to the one or more computers having instructions stored thereon which, when executed by the one or more computers, cause the one or more computers to perform operations comprising:
       organizing advertisements according to their meaning into a lexicon, the lexicon defining elements of a semantic space and represented by a network of interconnected meanings;
       receiving an input term;
       identifying a first point in the semantic space associated with the input term based on an interpretation of potential meanings of the input term;
       determining a first semantic sub-space that includes all of the elements of the semantic space within a predetermined radius of the first point;
       identifying, in the first semantic sub-space, an advertisement proximate in semantic distance to the input term, wherein the semantic distance identifies how closely related the advertisement is to the input term; and
       providing the advertisement in response to the input term.

15. The system of claim 14, wherein the operations further comprise:
    receiving an indication of a particular meaning;
    identifying a second point in the semantic space associated with particular meaning;
    determining a second semantic sub-space that includes all of the elements of the semantic space within the predetermined radius of the second point;
    identifying one or more advertisements in the second semantic sub-space; and
    providing the one or more advertisements in response to the input term.

16. The system of claim 14, wherein the operations further comprise:
    identifying keywords and meanings associated with the first semantic sub-space; and
    providing the keywords and meanings to a user.

17. The system of claim 14, wherein the operations further comprise:
    receiving an indication of a meaning to associate with each advertisement from an advertiser associated with each advertisement;
    receiving a cost-per-impression amount associated with the meaning from the advertiser; and
    charging each advertiser the cost-per-impression amount associated with the meaning if the advertisement is provided in response to an input term.

18. The system of claim of claim 17, wherein the operations further comprise:
    modifying the cost-per-impression amount associated with the meaning for the advertisement based on the semantic distance between a location in semantic space of the meaning and the input term.

19. The system of claim 18, wherein the semantic distance is inversely proportional to the cost-per-impression amount.

\* \* \* \* \*

UNITED STATES PATENT AND TRADEMARK OFFICE
CERTIFICATE OF CORRECTION

PATENT NO. : 7,698,266 B1  Page 1 of 1
APPLICATION NO. : 10/807264
DATED : April 13, 2010
INVENTOR(S) : Adam J. Weissman and Gilad Israel Elbaz It is certified that error appears in the above-identified patent and that said Letters Patent is hereby corrected as shown below:

On the Title Page, Item (56) (Other Publications), Line 3, Please delete "confrernce" and insert -- conference --

In Column 17, Line 42, Claim 12, before "11," delete "of claim" (Second Occurrence)

In Column 18, Line 45, Claim 18, before "17," delete "of claim" (Second Occurrence)

Signed and Sealed this

Thirteenth Day of July, 2010

David J. Kappos
*Director of the United States Patent and Trademark Office*